US012767038B2

(12) United States Patent
Fu et al.

(10) Patent No.: US 12,767,038 B2
(45) Date of Patent: Oct. 20, 2026

(54) STREETLIGHT BLOCKS ENHANCED ADAPTIVE HIGH BEAM CONTROL

(71) Applicant: ZENSEACT AB, Gothenburg (SE)

(72) Inventors: Junsheng Fu, Nödinge (SE); Per Lofter, Stora Höga (SE)

(73) Assignee: ZENSEACT AB, Gothenburg (SE)

( * ) Notice: Subject to any disclaimer, the term of this patent is extended or adjusted under 35 U.S.C. 154(b) by 86 days.

(21) Appl. No.: 18/897,429

(22) Filed: Sep. 26, 2024

(65) Prior Publication Data

US 2025/0100441 A1 Mar. 27, 2025

(30) Foreign Application Priority Data

Sep. 27, 2023 (EP) .................................... 23200208

(51) Int. Cl.
*B60Q 1/14* (2006.01)

(52) U.S. Cl.
CPC ........ *B60Q 1/143* (2013.01); *B60Q 2300/112* (2013.01); *B60Q 2300/3321* (2013.01)

(58) Field of Classification Search
CPC .............. B60Q 1/143; B60Q 2300/112; B60Q 2300/314; B60Q 2300/32; B60Q 2300/3321
See application file for complete search history.

(56) References Cited

U.S. PATENT DOCUMENTS 5,796,094 A * 8/1998 Schofield .............. B60S 1/0885 348/E7.086
6,587,573 B1 * 7/2003 Stam ...................... B60Q 1/143 382/104

(Continued)

FOREIGN PATENT DOCUMENTS

CN 107613618 A 1/2018
CN 111241972 A 6/2020

(Continued)

OTHER PUBLICATIONS

Communication pursuant to Article 94(3) EPC, European Patent Application No. 23200208.9, mailed Dec. 12, 2025, 6 pages.

(Continued)

*Primary Examiner* — Tyler J Lee
(74) *Attorney, Agent, or Firm* — Sage Patent Group

(57) ABSTRACT

Computer-implemented methods and related aspects for Adaptive High Beam Control (AHBC) for a vehicle are disclosed. The method comprises obtaining information about an existence of streetlighting for an upcoming road segment ahead of the vehicle from a digital map layer based on a current position of the vehicle, and wherein the digital map layer is formed from probe sourced data from a fleet of vehicles. Furthermore, the digital map layer comprises a plurality of streetlight blocks. Each streetlight block comprises a start and an end along a road, and each streetlight block defines a road segment having one or more streetlights. The method further comprises controlling an illumination of a space in front of the vehicle based on the obtained information about the existence of streetlighting for the upcoming road segment so to avoid casting high beam illumination towards road areas associated with streetlights.

14 Claims, 5 Drawing Sheets

(56) References Cited

U.S. PATENT DOCUMENTS

| | | | | |
|---|---|---|---|---|
| 6,728,393 | B2 * | 4/2004 | Stam | B60Q 1/143 382/104 |
| 7,566,851 | B2 * | 7/2009 | Stein | G08G 1/166 250/205 |
| 7,804,980 | B2 * | 9/2010 | Sasaki | G06V 20/56 382/217 |
| 8,993,951 | B2 * | 3/2015 | Schofield | B60Q 1/143 382/104 |
| 9,230,183 | B2 * | 1/2016 | Bechtel | B60R 1/04 |
| 11,676,403 | B2 * | 6/2023 | Kundu | H04N 13/239 382/104 |
| 2004/0143380 | A1 * | 7/2004 | Stam | H05B 47/17 340/467 |
| 2007/0047809 | A1 * | 3/2007 | Sasaki | G06V 20/56 382/170 |
| 2007/0221822 | A1 | 9/2007 | Stein et al. | |
| 2014/0355827 | A1 | 12/2014 | Ogawa | |
| 2017/0307397 | A1 * | 10/2017 | Sorstedt | G06V 20/588 |
| 2020/0055442 | A1 | 2/2020 | Epperlein et al. | |
| 2022/0230018 | A1 * | 7/2022 | Kundu | H04N 13/239 |
| 2023/0169860 | A1 * | 6/2023 | Singh | G08G 1/0141 701/117 |
| 2023/0202380 | A1 * | 6/2023 | Ikuta | B60Q 1/08 701/49 |

FOREIGN PATENT DOCUMENTS

| | | | |
|---|---|---|---|
| CN | 115837876 | A | 3/2023 |
| CN | 116801461 | A | 9/2023 |
| DE | 102016012701 | A1 | 6/2017 |
| EP | 1599905 | B1 | 7/2018 |
| EP | 3211372 | B1 | 9/2020 |
| JP | 4163413 | B2 | 10/2008 |
| KR | 102135901 | B1 | 7/2020 |
| WO | 2022128206 | A1 | 6/2022 |

OTHER PUBLICATIONS

Extended European Search Report mailed Feb. 12, 2024 for European Application No. 23200208.9, 10 pages.

* cited by examiner

STREETLIGHT BLOCKS ENHANCED ADAPTIVE HIGH BEAM CONTROL

CROSS-REFERENCE TO RELATED APPLICATIONS

The present application for patent claims priority to European Patent Office Application Ser. No. 23200208.9, entitled "STREETLIGHT BLOCKS ENHANCED ADAPTIVE HIGH BEAM CONTROL" filed on Sep. 27, 2023, assigned to the assignee hereof, and expressly incorporated herein by reference.

TECHNICAL FIELD

The disclosed technology relates to methods, systems, and other related aspects for Adaptive High Beam Control (AHBC) for a vehicle.

BACKGROUND

During these last few years, the development of autonomous vehicles has exploded and many different solutions are being explored. An increasing number of modern vehicles have advanced driver-assistance systems (ADAS) to increase vehicle safety and more generally road safety. ADAS-which for instance may be represented by adaptive cruise control, ACC, collision avoidance system, forward collision warning, etc.—are electronic systems that may aid a vehicle driver while driving. Today, development is ongoing in both ADAS as well as Autonomous Driving (AD), within a number of different technical areas within these fields.

Accordingly, in a not too distant future, ADS solutions will to a greater extent find their way into modern vehicles. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles and/or relevant signage.

In the realm of ADS solutions, Adaptive High Beam Control (AHBC) stands as a significant advancement, revolutionizing night time driving experiences. AHBC is a technology that adjusts a vehicle's headlight system to optimize visibility while ensuring the safety and comfort of both the driver and other road users. Over the years, AHBC has evolved to incorporate a fusion of sensors, cameras, and algorithms enabling the headlights to automatically switch between high and low beams or adjust the intensity of the light.

However, AHBC heavily relies on accurate sensor data, such as information from cameras, light sensors, and radar systems. Any inaccuracies or limitations in these sensors can lead to improper adjustments of the headlights, affecting both safety and user experience. A further challenge is that adverse weather conditions such as heavy rain, fog, or snow can impact sensor performance and affect the system's ability to accurately detect and respond to other vehicles. These conditions can pose challenges for AHBC systems to function effectively.

Despite the advancements in the technology, it is indeed challenging to provide systems and methods for AHBC with improved performance, safety, and user experience. Accordingly, there is still a need in the art for methods and systems capable of improving AHBC features.

SUMMARY

The herein disclosed technology seeks to mitigate, alleviate or eliminate deficiencies and disadvantages in the prior art to address various problems relating to an efficient and accurate operation of Adaptive High Beam Control (AHBC) feature for a vehicle.

It is therefore an object of the herein disclosed technology to provide a computer-implemented method, a computer-readable storage medium, a computer program product, a system, and a vehicle that alleviate all or at least some of the drawbacks of presently known systems and methods.

Further, it is an object of the herein disclosed technology to provide a computer-implemented method, a computer-readable storage medium, a computer program product, a system, and a vehicle that provides improved control of an illumination of a space in front of the vehicle.

Various aspects and embodiments of the disclosed invention are defined below and in the accompanying independent and dependent claims.

A first aspect of the disclosed technology comprises a computer-implemented method for Adaptive High Beam Control (AHBC) for a vehicle. The method comprises obtaining information about an existence of streetlighting for an upcoming road segment ahead of the vehicle from a digital map layer based on a current position of the vehicle, and wherein the digital map layer is formed from probe sourced data from a fleet of vehicles. Furthermore, the digital map layer comprises a plurality of streetlight blocks. Each streetlight block comprises a start and an end along a road, and each streetlight block defines a road segment having one or more streetlights. The method further comprises controlling an illumination of a space in front of the vehicle based on the obtained information about the existence of strectlighting for the upcoming road segment so to avoid casting high beam illumination towards road areas associated with streetlights.

Accordingly, there is provided a solution for providing an efficient AHBC feature for a vehicle. In more detail, the herein disclosed technology enables controlling the illumination for the upcoming road segment ahead of the vehicle based on streetlighting information. The information on streetlighting for the upcoming road segment ahead of the vehicle is obtained from a digital map layer. Specifically, the digital map layer comprises a plurality of streetlight blocks each of which defines one or more streetlight(s). Each of the streetlight blocks comprises a start location and an end location along a road. Finally, based on the obtained information about the existence of streetlighting for the upcoming road segment along which the vehicle is travelling the illumination of the space by the vehicle's head beams is controlled. Thus, when the existence of streetlighting for the upcoming road segment is identified, i.e., the digital map indicates one or more streetlight blocks, casting of high beam illumination towards road areas associated with streetlights may be avoided. Thus, the digital map layer comprising streetlight blocks may be used to guide the AHBC function/unit such that casting of high beams ahead of the vehicle may be controlled efficiently and accurately and in accordance with applicable regulations.

Consequently, the illumination ahead of the vehicle is efficiently and accurately controlled so to avoid casting high beam illumination towards areas that are illuminated by street lights in accordance with applicable regulation. Moreover, the risk of erroneously classifying a distant streetlight as an oncoming vehicle is reduced.

A second aspect of the disclosed technology comprises a computer program product comprising instructions which, when the program is executed by a computing device of a vehicle, causes the computing device to carry out the method according to any one of the embodiments disclosed herein. With this aspect of the disclosed technology, similar advantages and preferred features are present as in the previously discussed aspects.

A third aspect of the disclosed technology comprises a (non-transitory) computer-readable storage medium comprising instructions which, when executed by a computing device of a vehicle, causes the computing device to carry out the method according to any one of the embodiments disclosed herein. With this aspect of the disclosed technology, similar advantages and preferred features are present as in the previously discussed aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

A fourth aspect of the disclosed technology comprises a system for Adaptive High Beam Control (AHBC) for a vehicle. The system comprises one or more memory storage areas comprising program code, the one or more memory storage areas and the program code being configured to, with the one or more processors, cause the system to at least obtain information about an existence of streetlighting for an upcoming road segment ahead of the vehicle from a digital map layer based on a current position of the vehicle, wherein the digital map layer is formed from probe sourced data from a fleet of vehicles, and wherein the digital map layer comprises a plurality of streetlight blocks, each streetlight block comprising a start and an end along a road, and each streetlight block defining a road segment having one or more streetlights. Then, the one or more memory storage areas and the program code are configured to, with the one or more processors, cause the system to control an illumination of a space in front of the vehicle based on the obtained information about the existence of streetlighting for the upcoming road segment so to avoid casting high beam illumination towards road areas associated with streetlights. With this aspect of the disclosed technology, similar advantages and preferred features are present as in the previously discussed aspects.

A fifth aspect of the disclosed technology comprises a vehicle comprising a system according to any one of the embodiments disclosed herein. With this aspect of the disclosed technology, similar advantages and preferred features are present as in the previously discussed aspects.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general-purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may refer to more than one unit in some contexts, and the like. Furthermore, the words “comprising”, “including”, “containing” do not exclude other elements or steps. It should be emphasized that the term “comprises/comprising” when used in this specification is taken to specify the presence of stated features, integers, steps, or components. It does not preclude the presence or addition of one or more other features, integers, steps, components, or groups thereof. The term “and/or” is to be interpreted as meaning “both” as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

Figure 1:
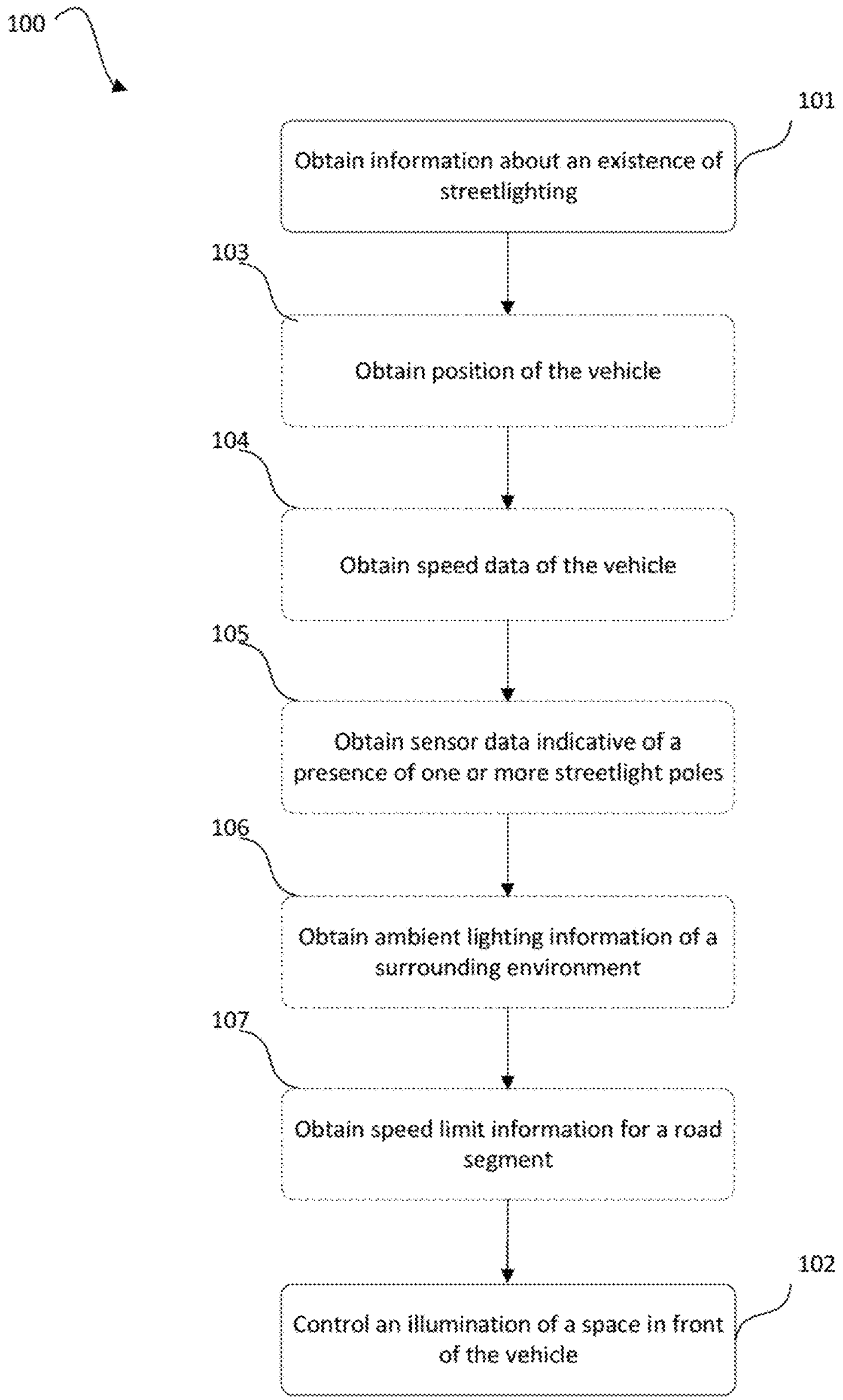
FIG. 1 is a schematic flowchart representation of a method for Adaptive High Beam Control (AHBC) for a vehicle in accordance with some embodiments.

FIG. 1 illustrates a schematic flow chart of a method 100 for Adaptive High Beam Control (AHBC) for a vehicle in accordance with some embodiments. The method 100 is preferably a computer-implemented method 100, performed by a processing system of the vehicle. The processing system may for example comprise one or more processors and one or more memories coupled to the one or more processors, wherein the one or more memories store one or more programs that perform the steps, services and functions of the method 100 disclosed herein when executed by the one or more processors.

The method 100 comprises obtaining 101 information about an existence of streetlighting for an upcoming road segment ahead of the vehicle from a digital map layer based on a current position of the vehicle. The term “obtaining” is herein to be interpreted broadly and encompasses receiving, retrieving, collecting, acquiring, and so forth directly and/or indirectly between two entities configured to be in communication with each other or further with other external entities. Moreover, the digital map layer is formed from probe sourced data from a fleet of vehicles and comprises a plurality of street light blocks. The digital map layer may be a layer of a standard definition map (SD-map) or a high definition map (HD-map), where the SD-map or HD-map accordingly comprises a streetlight layer having a plurality of the streetlight blocks where each streetlight block has a start and an end along a road and each streetlight block defines a road segment having one or more streetlights. Accordingly, the streetlight blocks may be construed as indications in the digital map representative of road segments that have streetlights associated thereto. In more detail, a limited and continuous series of streetlights placed along one or both sides of a road segment forms a streetlight block. In some embodiments, each streetlight block comprises a plurality of streetlights, where neighbouring streetlights, along the same road, whose distance from each other is below a distance value are comprised within the same streetlight block.

Moreover, the method 100 may further comprise obtaining 103 the position of the vehicle. The position of the vehicle may be construed as the vehicle’s geographical position, such as a map position (may also be referred to as in-map position) of the vehicle. A geographical position or map position can be understood as a set (two or more) of coordinates in a global coordinate system.

Further, the method 100 comprises controlling 102 an illumination of a space in front of the vehicle based on the obtained information about the existence of streetlighting for the upcoming road segment so to avoid casting high beam illumination towards road areas associated with streetlights. In other words, an AHBC unit/function of a vehicle may be configured to use the digital map layer as an input for controlling the illumination of the space in front of the vehicle. Accordingly, the illumination may be controlled before the vehicle enters to an urban area (indicated by the upcoming streetlight block), thereby safety for both the driver and other road users may be improved.

In some embodiments, the method 100 further comprises obtaining 104 speed data of the vehicle, and the controlling 102 the illumination of the space in front of the vehicle is further based on the obtained speed data. Speed data of the vehicle may also be an indication of an upcoming urban environment, i.e., the driving speed of the vehicle may be assumed to be low when entering or traveling within an urban area. Accordingly, in response to the driving speed of the vehicle being less than a speed value (e.g., 60 km/h, 50 km/h, 40 km/h, etc.), the method 100 may comprise controlling 102 an illumination of a space in front of the vehicle based on the obtained speed data of the vehicle so to avoid casting high beam illumination, as this may be used as a proxy indicator of the vehicle being in or approaching an urban area.

In some embodiments, the method 100 comprises obtaining 105 sensor data indicative of a presence of one or more streetlight poles in a surrounding environment of the vehicle from one or more sensors configured to monitor the surrounding environment of the vehicle and the controlling 102 the illumination of the space in front of the vehicle may be further based on the presence of one or more streetlight poles as indicated by the obtained 105 sensor data. The surrounding environment of the ego-vehicle can be understood as a general area around the ego-vehicle in which objects (such as other vehicles, landmarks, obstacles, etc.) can be detected and identified by vehicle sensors (radar, LIDAR, cameras, etc.), i.e. within a sensor range of the ego-vehicle.

Accordingly, the method 100 may comprise detecting one or more streetlight poles based on sensor data. The sensor data may be obtained from on-board sensors, such as cameras, LIDARs and RADARs etc. The obtained sensor data indicative of a presence of one or more streetlight poles may be used as a proxy indicator of an urban area, i.e., in order to assess whether the vehicle is approaching an urban area or traveling in an urban area. Moreover, the obtained 105 sensor data may be assessed based on a time-series fluctuation, e.g., an indicated streetlight pole number of a detection frame unit may be compared with an indicated streetlight pole number of a previous detection frame unit. An increasing number of the street light poles may be an indication of an upcoming urban area. Alternatively, the number streetlight poles may be counted and evaluated as a total number or as a number per unit of distance. Above a certain number, it may be assumed that an urban environment is ahead or entered. Thus, in response to the obtained 105 sensor data indicates an upcoming urban area, such as in response to the number of streetlight poles being more than a certain number or more than a certain number per unit of distance, the method 100 may comprise controlling 102 an illumination of a space in front of the vehicle so to avoid casting high beam illumination.

Moreover, the method 100 may comprise obtaining 106 sensor data comprising ambient lighting information of a surrounding environment of the vehicle from one or more sensors configured to monitor the surrounding environment of the vehicle. The controlling 102 the illumination of the space in front of the vehicle may be further based on the obtained 106 ambient lighting information of the surrounding environment. In other words, the method 100 may comprise obtaining 106 ambient lighting information based on sensor data. The sensor may be a daylight sensor, a camera or any other sensor configured for sensing brightness within the field of view of the sensor. If the obtained 106 sensor data indicates day-light conditions the method 100 may comprise controlling 102 an illumination of a space in front of the vehicle so to avoid casting high beam illumination. Whereas if the obtained sensor data indicates night-time the method 100 may comprise controlling 102 an illumination of the space in front of the vehicle so to cast high-beam illumination towards an area in front of the vehicle, unless other conditions are satisfied, such as that the vehicle is approaching, traveling within, or traveling along a streetlight block, the speed being below a speed value, sensor data indicating presence of streetlight poles, and/or sensor data indicating of a presence of another vehicle in front of the ego-vehicle.

As used herein, the term "if" may be construed to mean "when" or "upon" or "in response to determining" or "in response to detecting" depending on the context. As used herein, the term "if the obtained sensor data indicates ambient lighting information" may be construed to "upon detecting and identifying night-time or day-time" or "in response to detecting night-time or day-time". Similarly, the phrase "if it is determined' or "when it is determined" or "in an instance of" may be construed to mean "upon determining or "in response to determining" or "upon detecting and identifying occurrence of an event" or "in response to detecting occurrence of an event" depending on the context.

In some embodiments, the method 100 comprises obtaining 107 information about a speed limit for the upcoming road segment ahead of the vehicle from the digital map based on the current position of the vehicle and/or from one or more sensors configured to monitor a surrounding environment of the vehicle. The speed limit of the upcoming road segment may be obtained from a digital map comprising speed limit information for specific road segments, based on the current position of the vehicle. Alternatively or additionally, speed limit signs along the road may be monitored continuously by sensors, such as forward-facing cameras of the vehicle, and the associated speed limit for an upcoming road segment may be derived from the sensor data.

Further, the obtained information of the speed limit may be an indication of a probable speed, such as driving speed of the vehicle. The speed limit may therefore be a proxy indicator for the driving speed. In an example, if obtained information of the speed limit indicates the speed limit as X km/h, it may be assumed that the vehicle speed is X km/h or lower. Furthermore, with a similar analogy to the obtained 104 speed data of the vehicle, obtained 107 information about a speed limit for the upcoming road segment may compose basis for detecting whether the vehicle is approaching an urban area. Accordingly, in some embodiments, the method 100 comprises controlling 102 the illumination of the space in front of the vehicle based on the obtained information about the speed limit for the upcoming road segment.

Accordingly, in some embodiments, the method 100 further comprises controlling 102 an illumination of a space in front of the vehicle further based on a combination one or more of the following: data indicative of a presence of one or more streetlight poles in a surrounding environment of the vehicle, speed data of the vehicle, or ambient lighting information of the surrounding environment of the vehicle.

Executable instructions for performing these functions are, optionally, included in a non-transitory computer-readable storage medium or other computer program product configured for execution by one or more processors.

Figure 2:
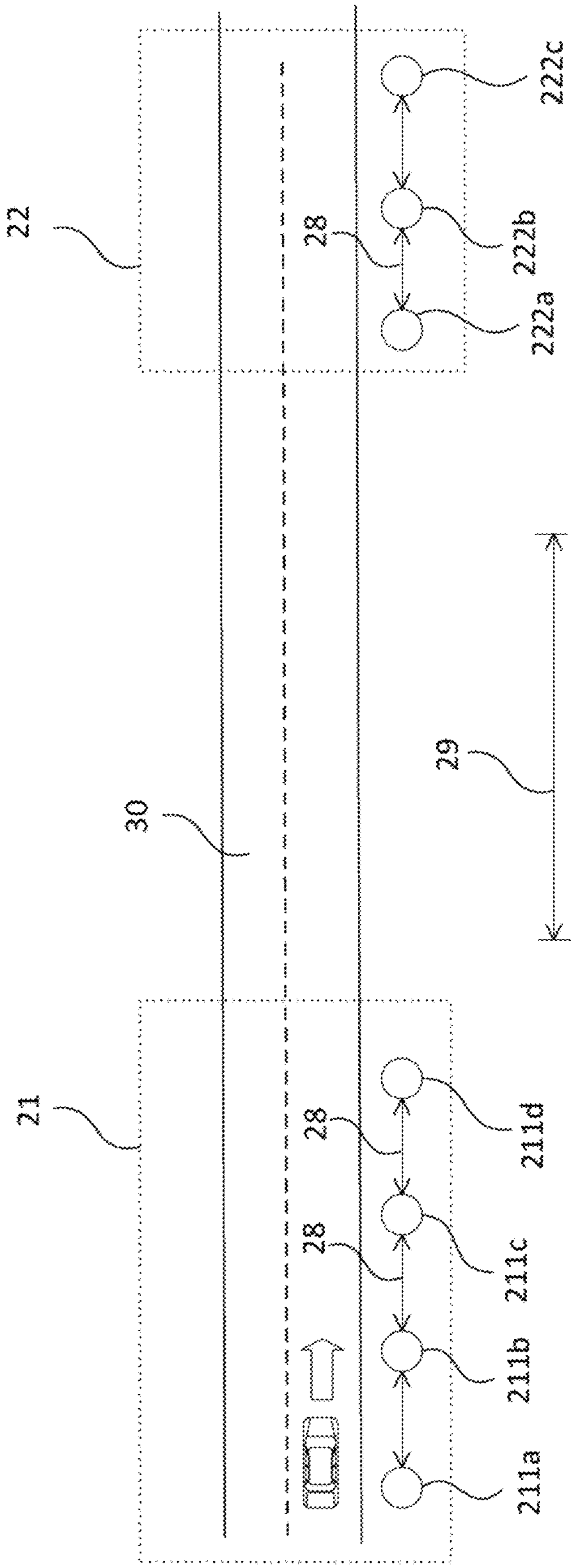
FIG. 2 is a schematic top-view illustration of streetlight blocks in accordance with some embodiments.

Moving on, FIG. 2 is a schematic illustration of a pair of streetlight blocks in accordance with some embodiments. Each streetlight block 21, 22 comprise one or more streetlights 211*a-d*, 222*a-c* and defines a road segment having the streetlights 211*a-d*, 222*a-c*. It should be noted that the illustrations herein are not necessarily to-scale and primarily serve the purpose to facilitate the understanding of the described embodiments.

In some embodiments, only the streetlights 211*a-d*, 222*a-c*, along the same road 30, where the distance 28 between neighbouring streetlights is below a distance value 29 are comprised within the same streetlight block 21, 22. Thus, a streetlight block 21, 22 may be defined by a plurality of streetlights or streetlight poles 211*a-d*, 222*a-c*, where a distance 28 between neighbouring streetlights is below a set distance value 29. For example, a first streetlight block 21 in FIG. 2 comprises four streetlights 211*a-d* where the distance 28 between neighbouring/adjacent streetlights is below the set distance value 29. The distance between neighbouring streetlights may be the same or it may differ. However, as long as the distance 28 between neighbouring streetlights are below the set value, the streetlights 211*a-d* are comprised within the same streetlight block 21. A second streetlight block 22 of FIG. 2 comprises three streetlights 222*a-c*, where the distance 28 between neighbouring streetlights is below the set distance value 29. The distance 28 between neighbouring streetlights may be the same or may differ. However, as long as the distance 28 between the neighbouring/adjacent streetlights is below the set value 29, the streetlights 222*a-c* are comprised within the same streetlight block 22. The set distance value 29 may for example be in the range of 50 m to 500 m, such as e.g., 100 m, 200 m, 250 m, or 300 m.

Further, each streetlight block 21, 22 comprises a start and an end (may also be referred to as starting location and ending location) along the road 30. In more detail, the digital map layer indicates starting and ending location of each streetlight blocks 21, 22. The starting and ending locations of a streetlight block may be based on the location of a first streetlight 211*a*, 222*a* and the location a last streetlight 211*d*, 222*c* within the respective streetlight block 21, 22. For example, the starting location of the first streetlight block 21 may be based on the localization of the streetlight 211*a* that appears first along the driving direction (indicated with an arrow in FIG. 2). The ending location of the first streetlight block 21 may be the last streetlight 211*d* that appears the last along the driving direction. Moreover, the start and end of each street light block 21, 22 may be aligned with the location of the first streetlight 211*a*, 222*a* and last streetlight 211*d*, 222*c* in each block 21, 22 respectively. Alternatively, the start of each streetlight block 21, 22 may be set some distance (e.g., 10 m, 20 m, 50 m, 100 m, 200 m, etc.) before the first streetlight 211*a*, 222*a* and the end of each streetlight block 21, 22 may be set some distance after the last streetlight 211*d*, 222*c*. The terms "before" and "after" in this context could be understood as "in front of" and "behind" from the perspective of the traveling direction of the vehicle.

The streetlight blocks 21, 22 may be defined as geofenced areas within the digital map layer as indicated in FIG. 2. The geofenced areas may accordingly enclose the streetlights 211*a-d*, 222*a-c* of the respective block 21, 22 and the associated road portion/segment. Thus, the illumination space in front of the vehicle may be controlled based on the vehicle's position relative to the geofenced area defining the streetlight blocks so to avoid casting high beam illumination towards road areas associated with streetlights.

Figure 3:
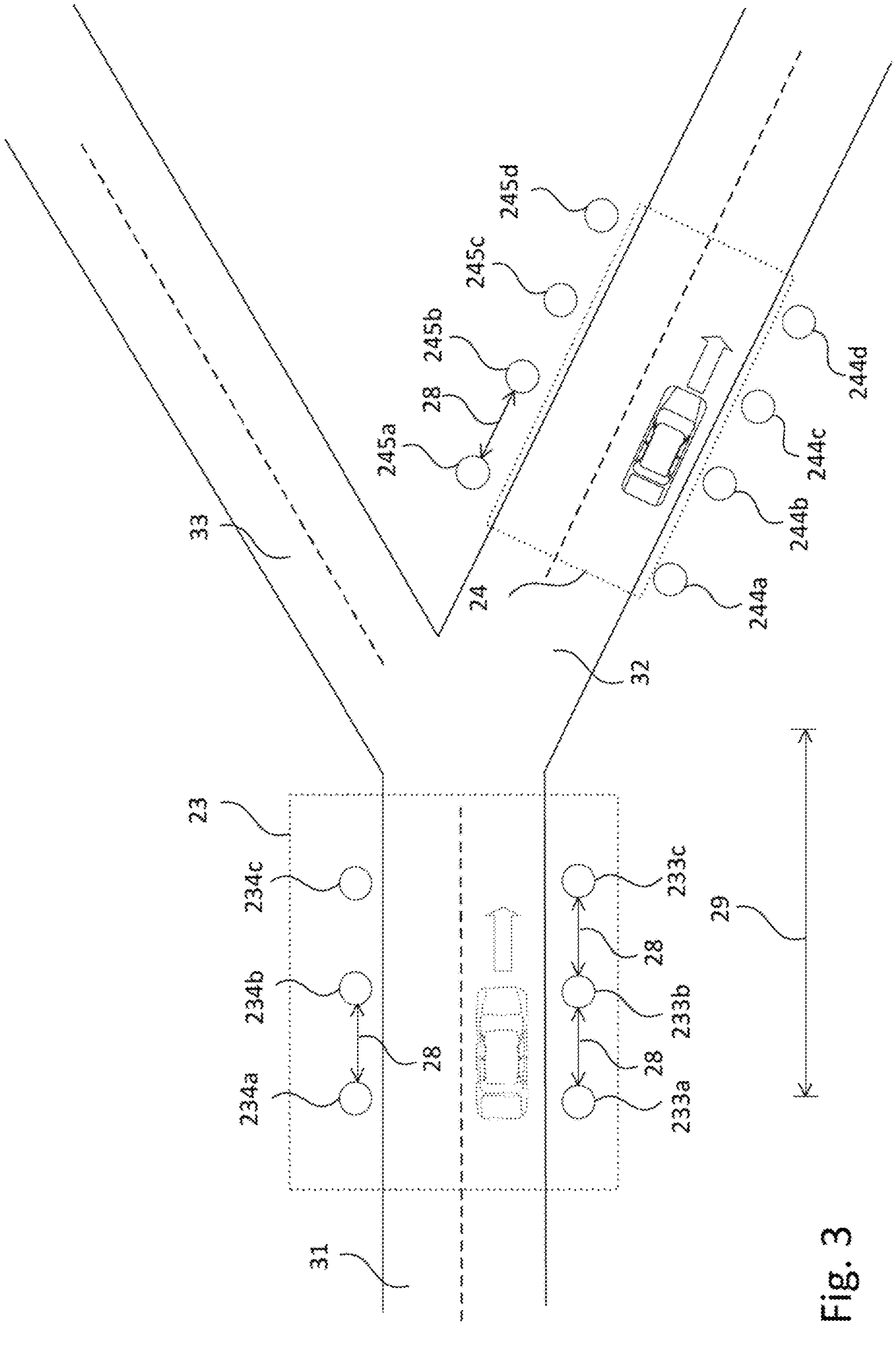
FIG. 3 is a schematic top-view illustration of streetlight blocks in accordance with some embodiments.

Yet another schematic top-view illustration of a pair of streetlight blocks 23, 24 defining a respective road segment of a road 31, 32 having one or more streetlights associated thereto. in accordance with some embodiments is shown in FIG. 3. Each streetlight block 23, 24, 25 defines a road segment having one or more streetlights 233*a-c*, 234*a-c*, 244*a-d*, 245*a-d*, 255*a-b*. In more detail, a first streetlight block 23 comprises three streetlights 233*a-c*, 234*a-c* on each side of a common associated road segment of a road 31. Thus, if there are streetlights 233*a-c*, 234*a-c* that extend in parallel along a respective side of the same road segment, then those streetlights may be comprised in the same streetlight block 23. Similarly, a second streetlight block 24 has four streetlights 244*a-d*, 245*a-d* on each side of a common associated road segment of another road 32. Moreover, FIG. 3 also depicts a road segment 33 without any associated streetlights and therefore no streetlight blocks.

FIG. 3 further illustrates two alternative geofencing solutions in each respective streetlight block 23. Here, the first streetlight block 23 is defined as geofenced area enclosing both the streetlights 233*a-c*, 234*a-c* and the associated road segment of the road 31. However, the second streetlight block 24 is defined as geofenced area enclosing the road segment of the road 32 without enclosing the streetlights 244*a-d*, 245*a-d* associated thereto. Using a geofencing solution that encloses the road segment having one or more streetlights facilitates the implementation of the AHBC as discussed herein, and provides for a simple and robust means for the AHBC to be controlled so to avoid casting high beam illumination towards road areas associated with streetlights.

Moreover, in some embodiments, each streetlight block 21-24 may only encompass a single continuous road. In this context, a single continuous road is to be understood a stretch of road absent of road splits or road crossings. Thus, in situations where two streetlights would be separated by a distance smaller than the set distance value 29 (e.g., streetlight 233*c* and 244*a* in FIG. 3) they would still not be comprised in the same streetlight block if the two streetlights are located along two different roads. Thus, in some embodiments, any type of road split or road crossing would result in a new streetlight block starting for the diverging road segment, assuming that there are streetlights along the road segment after the road split or road crossing.

Figure 4:
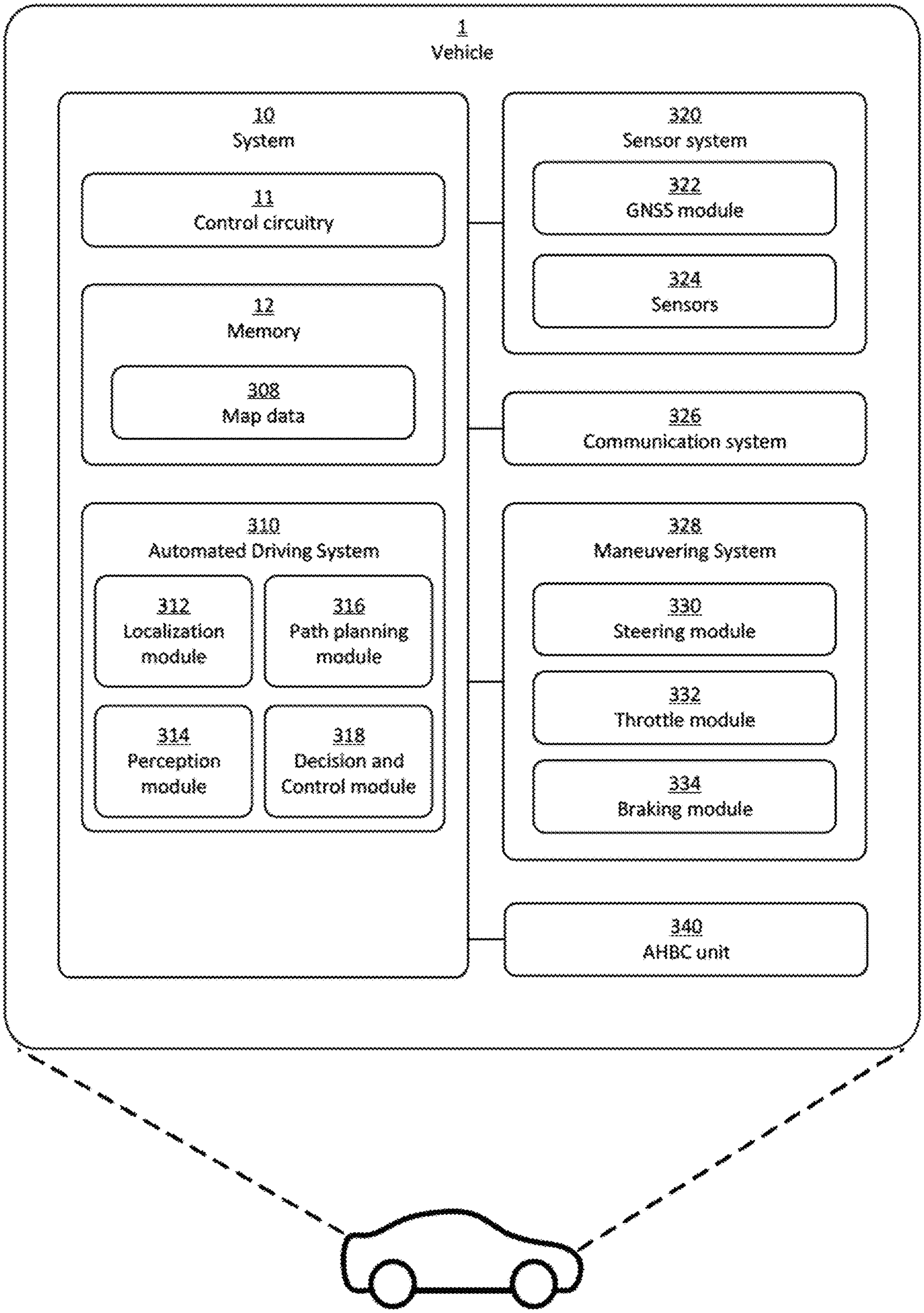
FIG. 4 is a schematic diagram of a vehicle comprising a system for Adaptive High Beam Control (AHBC) of the vehicle in accordance with some embodiments.

FIG. 4 is a schematic illustration of a vehicle 1 comprising a system 10 for Adaptive High Beam Control (AHBC) for the vehicle in accordance with some embodiments. As used herein, a "vehicle" is any form of motorized transport. For example, the vehicle 1 may be any road vehicle such as a car (as illustrated herein), a motorcycle, a (cargo) truck, a bus, etc.

The system 10 comprises control circuitry 11 and a memory 12. The control circuitry 11 may physically comprise one single circuitry device. Alternatively, the control circuitry 11 may be distributed over several circuitry devices. As an example, the apparatus 10 may share its control circuitry 11 with other parts of the vehicle 1 (e.g. the Automated Driving System (ADS) 310). Moreover, the system 10 may form a part of the ADS 310, i.e. the system 10 may be implemented as a module or feature of the ADS. The term "ADS" as used herein is to be understood as an Advanced Driver Assistance System (ADAS) or an Autonomous Driving (AD) system. Thus, "ADS" as used herein may comprise one or more features or functions of any level 0-5 according to SAE J3016 levels of driving automation for on-road vehicles. Moreover, in some embodiments, the apparatus 10 forms a part of the AHBC unit 340.

The control circuitry 11 may comprise one or more processors, such as a central processing unit (CPU), microcontroller, or microprocessor. The one or more processors may be configured to execute program code stored in the memory 12, in order to carry out various functions and operations of the vehicle 1 in addition to the methods disclosed herein. The processor(s) may be or include any number of hardware components for conducting data or signal processing or for executing computer code stored in the memory 12. The memory 12 optionally includes high-speed random-access memory, such as DRAM, SRAM, DDR RAM, or other random-access solid-state memory devices; and optionally includes non-volatile memory, such as one or more magnetic disk storage devices, optical disk storage devices, flash memory devices, or other non-volatile solid-state storage devices. The memory 12 may include database components, object code components, script components, or any other type of information structure for supporting the various activities of the present description.

In the illustrated example, the memory 12 further stores map data 308. The map data 308 may for instance be used by the ADS 310 of the vehicle 1 in order to perform autonomous functions of the vehicle 1. The map data 308 may comprise standard-definition (SD) map data and/or high-definition (HD) map data. The map data 308 may comprise the digital map layer comprising streetlighting information as described in the foregoing. It is contemplated that the memory 12, even though illustrated as a separate element from the ADS 310, may be provided as an integral element of the ADS 310. However, in some embodiments, the map data 308 may be stored in a remote server (e.g., a cloud server) whereupon the map data is streamed or otherwise provided to the vehicle from the remote server. For example, the vehicle may request specific portions of the map data based on a current position and estimated route of the vehicle, thereby avoiding using up memory storage space in the vehicle for irrelevant map data.

In other words, according to an exemplary embodiment, any distributed or local memory device may be utilized in the realization of the present inventive concept. Similarly, the control circuitry 11 may be distributed e.g. such that one or more processors of the control circuitry 11 is provided as integral elements of the ADS 310 or any other system of the vehicle 1. In other words, according to an exemplary embodiment, any distributed or local control circuitry device may be utilized in the realization of the present inventive concept. The ADS 310 is configured carry out the functions and operations of the autonomous or semi-autonomous functions of the vehicle 1. The ADS 310 can comprise a number of modules, where each module is tasked with different functions of the ADS 310.

The vehicle 1 comprises a number of elements which can be commonly found in autonomous or semi-autonomous vehicles. It will be understood that the vehicle 1 can have any combination of the various elements shown in FIG. 4. Moreover, the vehicle 1 may comprise further elements than those shown in FIG. 4. While the various elements are herein shown as located inside the vehicle 1, one or more of the elements can be located externally to the vehicle 1. For example, the map data may be stored in a remote server and accessed by the various components of the vehicle 1 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 1 of FIG. 5 should be seen merely as an illustrative example, as the elements of the vehicle 1 can be realized in several different ways.

The vehicle 1 further comprises a sensor system 320. The sensor system 320 is configured to acquire sensory data about the vehicle itself, or of its surroundings. The sensor system 320 may for example comprise a Global Navigation Satellite System (GNSS) module 322 such as a GPS configured to collect geographical position data of the vehicle 1. The sensor system 320 may further comprise one or more sensors 324. The one or more sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via dedicated sensor control circuitry in the vehicle 1.

The vehicle 1 further comprises a communication system 326. The communication system 326 is configured to communicate with external units, such as other vehicles (i.e. via vehicle-to-vehicle (V2V) communication protocols), remote servers (e.g. cloud servers), databases or other external devices, i.e. vehicle-to-infrastructure (V2I) or vehicle-to-everything (V2X) communication protocols. The communication system 318 may communicate using one or more communication technologies. The communication system 318 may comprise one or more antennas (not shown). Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g. remote operator or control center) and/or to receive input from a remote location by means of the one or more antennas. Moreover, the communication system 326 may be further configured to allow the various elements of the vehicle 1 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth, or similar mid/short range technologies.

The vehicle 1 further comprises a maneuvering system 320. The maneuvering system 328 is configured to control the maneuvering of the vehicle 1. The maneuvering system 328 comprises a steering module 330 configured to control the heading of the vehicle 1. The maneuvering system 328 further comprises a throttle module 332 configured to control actuation of the throttle of the vehicle 1. The maneuvering system 328 further comprises a braking module 334 configured to control actuation of the brakes of the vehicle 1. The various modules of the maneuvering system 328 may also receive manual input from a driver of the vehicle 1 (i.e. from a steering wheel, a gas pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 1, for example via the decision and control module 318.

The vehicle 1 further comprises a lighting system (not shown) for controlling the external lights of the vehicle 1. The lighting system may for example be operatively connected to the AHBC unit 340 so to receive input signals from the AHBC unit 340. Thus, the AHBC unit 340 may be configured to output signals to the lighting system in order to control the headlights of the vehicle 1 and in particular the high beams of the vehicle. As readily understood by the skilled person in the art, the lighting system may further control activation/deactivation of various external lights of the vehicle 1 such as turn indicators, brake lights, reverse lights, and so forth based on an input from various control systems of the vehicle 1.

The ADS 310 may comprise a localization module 312 or localization block/system. The localization module 312 is configured to determine and/or monitor a geographical position and heading of the vehicle 1, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system 314. The perception module 314 may refer to any commonly known module and/or functionality, e.g. comprised in one or more electronic control modules and/or nodes of the vehicle 1, adapted and/or configured to interpret sensory data-relevant for driving of the vehicle 1—to identify e.g. obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data e.g. from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

Specifically, the system 10 for Adaptive High Beam Control (AHBC) comprises one or more memory storage areas 12 comprising program code, the one or more memory storage areas 12 and the program code being configured to, with the one or more processors 11, cause the system 10 to at least obtain information about an existence of streetlighting for an upcoming road segment ahead of the vehicle from a digital map layer based on a current position of the vehicle. The digital map layer is formed from probe sourced data from a fleet of vehicles.

Moreover, the digital map layer comprises a plurality of streetlight blocks, where each streetlight block comprises a start and an end along a road, and each streetlight block defines a road segment having one or more streetlights. Furthermore, the program code is configured to cause the system 10 to control an illumination of a space in front of the vehicle based on the obtained information about the existence of streetlighting for the upcoming road segment so to avoid casting high beam illumination towards road areas associated with streetlights.

Moreover, the one or more memory storage areas 12 and the program code may be configured to, with the one or more processors 11, cause the system 10 to at least obtain speed data of the vehicle 1. Accordingly, the control of the illumination of the space in front of the vehicle may be further based on the obtained speed data.

Furthermore, the one or more memory storage areas 12 and the program code may be configured to, with the one or more processors 11, cause the system 10 to at least obtain sensor data indicative of a presence of one or more streetlight poles in a surrounding environment of the vehicle 1 from one or more sensors 324 configured to monitor the surrounding environment of the vehicle 1. Accordingly, the control of the illumination of the space in front of the vehicle 1 may be further based on the presence of one or more streetlight poles.

Moreover, in some embodiments, the one or more memory storage areas 12 and the program code is configured to, with the one or more processors 11, cause the system 10 to at least obtain sensor data comprising ambient lighting information of a surrounding environment of the vehicle from one or more sensors 324 configured to monitor the surrounding environment of the vehicle. Accordingly, the control of the illumination of the space in front of the vehicle 1 may be further based on the obtained ambient lighting information of the surrounding environment.

In some embodiments, the one or more memory storage areas 12 and the program code is configured to, with the one or more processors 11, cause the system 10 to at least obtain information about a speed limit for the upcoming road segment ahead of the vehicle 1 from the digital map 308 based on the current position of the vehicle and/or from one or more sensors 324 configured to monitor a surrounding environment of the vehicle 1. Accordingly, the control of the illumination of the space in front of the vehicle may be further based on the obtained information about the speed limit for the upcoming road segment.

Figure 5:
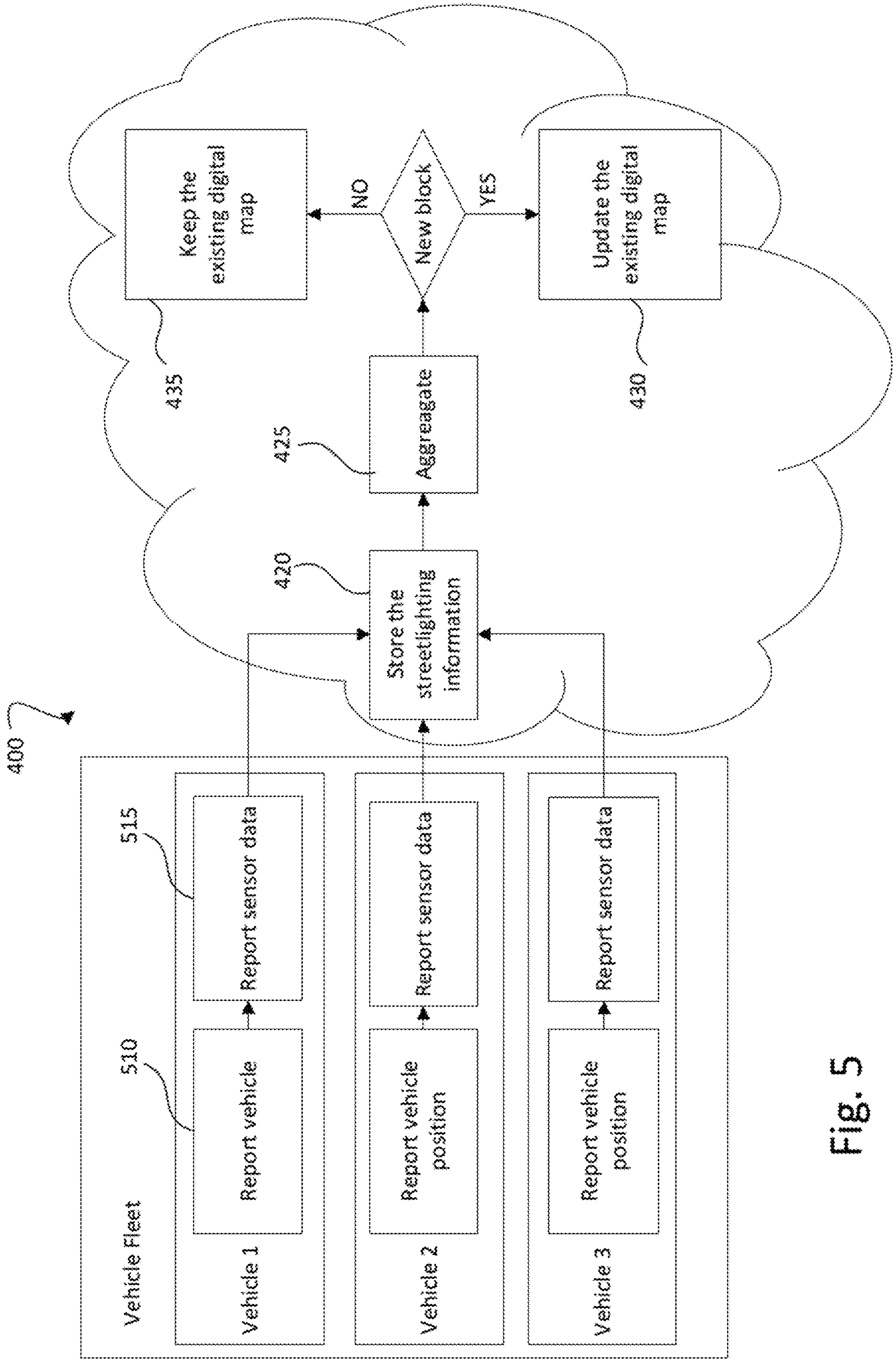
FIG. 5 is a schematic flow chart of a method for building a streetlight map layer within a digital map layer in accordance with some embodiments.

Furthermore, another aspect of the herein disclosed technology comprises a method 400 for building a streetlight map layer within a digital map. FIG. 5 is a schematic flow chart of a method 400 for building a streetlight map layer within a digital map in accordance with some embodiments.

The method 400 comprises storing 420 streetlighting information sourced from a fleet of vehicles. Here, each vehicle may be configured to transmit 510 its map position (i.e., geographical position, e.g., GNSS position) and to transmit 515 sensor data to a central server (e.g., a fleet management system) via a communications network (e.g., WLAN or cellular network). The transmitted 515 sensor data comprises information about a presence of streetlighting along a road segment upon which the vehicle is traveling or has travelled. In some embodiments, the sensor data may comprise a position of one or more streetlight poles relative to the vehicle.

Thus, the stored 420 streetlighting information may accordingly comprise an indication of a presence of streetlighting along one or more road segments and the location of these road segments. The stored 420 streetlighting information is then aggregated 425 over time based on the reported data from each vehicle in the vehicle fleet. Further, the method 400 may further comprise checking if the aggregated 425 information indicates a presence of a new street light block or if it is already encompassed by an existing street light block. Thus, if the aggregated 425 information indicates a presence of a new street light block, the digital map is updated 430. In more detail, the streetlight map layer is updated 430 in response to the aggregated 425 information indicating a presence of a new street light block. However, if the aggregated 425 information indicates a presence of streetlights that are already encompassed by an existing street light block of the streetlight map layer, no update is performed.

Moreover, in some embodiments, once the digital map is updated 430 by an updated streetlight map layer, the method 400 comprises transmitting the updated 430 digital map to the fleet of vehicles.

The present technology has been presented above with reference to specific embodiments. However, other embodiments than the above described are possible and within the scope of the herein disclosed technology. Different method steps than those described above, performing the method by hardware or software, may be provided within the scope of the herein disclosed technology. Thus, according to some embodiments, there is provided a non-transitory computer-readable storage medium storing one or more programs configured to be executed by one or more processors of a vehicle control system, the one or more programs comprising instructions for performing the method according to any one of the above-discussed embodiments. Alternatively, according to some embodiments a cloud computing system may be configured to perform any of the methods presented herein. The cloud computing system may comprise distributed cloud computing resources that jointly perform the methods presented herein under control of one or more computer program products.

It should be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of obtaining the position of the vehicle and obtaining speed data of the vehicle may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various processing steps, comparison steps and decision steps. The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A computer-implemented method for Adaptive High Beam Control (AHBC) for a vehicle, the method comprising:
   - obtaining information about an existence of streetlighting for an upcoming road segment ahead of the vehicle from a digital map layer based on a current position of the vehicle, wherein the digital map layer is formed from probe sourced data from a fleet of vehicles,
   - wherein the digital map layer comprises a plurality of streetlight blocks, each streetlight block comprising a start and an end along a road, and each streetlight block defining a road segment having one or more streetlights;
   - controlling an illumination of a space in front of the vehicle based on the obtained information about the existence of streetlighting for the upcoming road segment so to avoid casting high beam illumination towards road areas associated with streetlights.

2. The method according to claim 1, comprising:
   - obtaining speed data of the vehicle; and
   - wherein the controlling the illumination of the space in front of the vehicle is further based on the obtained speed data.

3. The method according to claim 1, further comprising:
   - obtaining sensor data indicative of a presence of one or more streetlight poles in a surrounding environment of the vehicle from one or more sensors configured to monitor the surrounding environment of the vehicle; and
   - wherein the controlling the illumination of the space in front of the vehicle is further based on the presence of one or more streetlight poles.

4. The method according to claim 1, further comprising:
   - obtaining sensor data comprising ambient lighting information of a surrounding environment of the vehicle from one or more sensors configured to monitor the surrounding environment of the vehicle; and
   - wherein the controlling the illumination of the space in front of the vehicle is further based on the obtained ambient lighting information of the surrounding environment.

5. The method according to claim 1, further comprising:
   - obtaining information about a speed limit for the upcoming road segment ahead of the vehicle from the digital map based on the current position of the vehicle and/or from one or more sensors configured to monitor a surrounding environment of the vehicle; and
   - wherein controlling the illumination of the space in front of the vehicle is further based on the obtained information about the speed limit for the upcoming road segment.

6. The method according to claim 1, further comprising obtaining the position of the vehicle.

7. The method according to claim 1, wherein each streetlight block comprises a plurality of streetlights, wherein neighbouring streetlights, along the same road, whose distance from each other is below a distance value are comprised within the same streetlight block.

8. A non-transitory computer-readable storage medium storing instructions which, when executed by a computing device of a vehicle, causes the computing device to carry out the method according to claim 1.

9. A system for Adaptive High Beam Control (AHBC) for a vehicle, the system comprising one or more memory storage areas comprising program code, the one or more memory storage areas and the program code being configured to, with one or more processors, cause the system to at least:
   - obtain information about an existence of streetlighting for an upcoming road segment ahead of the vehicle from a digital map layer based on a current position of the vehicle, wherein the digital map layer is formed from probe sourced data from a fleet of vehicles,
   - wherein the digital map layer comprises a plurality of streetlight blocks, each streetlight block comprising a start and an end along a road, and each streetlight block defining a road segment having one or more streetlights; and
   - control an illumination of a space in front of the vehicle based on the obtained information about the existence of streetlighting for the upcoming road segment so to avoid casting high beam illumination towards road areas associated with streetlights.

10. The system according to claim 9, wherein the one or more memory storage areas and the program code is configured to, with the one or more processors, cause the system to at least:
   - obtain speed data of the vehicle; and
   - wherein the control of the illumination of the space in front of the vehicle is further based on the obtained speed data.

11. The system according to claim 9, wherein the one or more memory storage areas and the program code is configured to, with the one or more processors, cause the system to at least:
   - obtain sensor data indicative of a presence of one or more streetlight poles in a surrounding environment of the vehicle from one or more sensors configured to monitor the surrounding environment of the vehicle; and
   - wherein the control of the illumination of the space in front of the vehicle is further based on the presence of one or more streetlight poles.

12. The system according to claim 9, wherein the one or more memory storage areas and the program code is configured to, with the one or more processors, cause the system to at least:
   - obtain sensor data comprising ambient lighting information of a surrounding environment of the vehicle from one or more sensors configured to monitor the surrounding environment of the vehicle; and
   - wherein the control of the illumination of the space in front of the vehicle is further based on the obtained ambient lighting information of the surrounding environment.

13. The system according to claim 9, wherein the one or more memory storage areas and the program code is configured to, with the one or more processors, cause the system to at least:
   - obtain information about a speed limit for the upcoming road segment ahead of the vehicle from the digital map based on the current position of the vehicle and/or from one or more sensors configured to monitor a surrounding environment of the vehicle; and
   - wherein the control of the illumination of the space in front of the vehicle is further based on the obtained information about the speed limit for the upcoming road segment.

14. A vehicle comprising a system according to claim 9.

* * * * *